United States Patent [19]
Curtis et al.

[11] 3,934,090
[45] Jan. 20, 1976

[54] TELEPHONE MESSAGE TIMING SYSTEM

[75] Inventors: Robert Bartlett Curtis; Nelson Andrew Riedel, both of Columbus, Ohio

[73] Assignee: Bell Telephone Laboratories, Incorporated, Murray Hill, N.J.

[22] Filed: Oct. 21, 1974

[21] Appl. No.: 516,624

[52] U.S. Cl............................................ 179/7.1 R
[51] Int. Cl.²..................................... H04M 15/18
[58] Field of Search 179/7.1 R, 7 R, 7 MM, 7.1 TP, 179/1 MN, 1 TC, 172.5 R

[56] References Cited
UNITED STATES PATENTS

| | | | |
|---|---|---|---|
| 2,599,358 | 6/1952 | Cahill et al............................ | 179/7 R |
| 3,551,599 | 12/1970 | White.................................... | 179/7.1 R |
| 3,806,652 | 4/1974 | Woolf et al. ........................ | 179/7.1 R |
| 3,812,293 | 5/1974 | Padgett............................ | 179/7.1 TP |

Primary Examiner—Kathleen H. Claffy
Assistant Examiner—Gerald L. Brigance
Attorney, Agent, or Firm—D. A. Marshall

[57] ABSTRACT

A timing arrangement for use with a telephone switching system equipped with automatic message accounting equipment to adjust call charging times to compensate for delays in obtaining access to the automatic message accounting equipment. Timing circuitry provided in an automatic message accounting recorder measures the period of time since the recorder was last idle with no call carrying trunks of the switching system waiting to be serviced by the recorder. Apparatus enabled by the timing circuitry generates an allowance time used to adjust a registered trunk call charging time in accordance with the trunk access delay to the automatic message accounting equipment.

10 Claims, 3 Drawing Figures

3,934,090

TELEPHONE MESSAGE TIMING SYSTEM

BACKGROUND OF THE INVENTION

1. Field of the Invention

This invention concerns switching systems. In particular, it relates to the charging of calls originated by stations served by a switching system.

2. Description of the Prior Art

Switching systems designed to interconnect calling telephone stations with called telephone stations are oftentimes provided with automatic message accounting equipment arranged to assess message charges against calling telephone stations. When a telephone station is utilized to originate a call to a called telephone station, the serving switching system accesses automatic message accounting equipment to record an initial entry identifying the calling telephone station, the called telephone station, and the switching system trunk equipment used to establish a call connection. After the call connection has been established, the switching system trunk equipment detects answer of the call by the called telephone station and again accesses the automatic message accounting equipment in order that an answer entry may be recorded identifying the time the call was answered. Subsequently, the switching system trunk equipment detects the disconnect of the telephone stations from the call connection and again accesses the automatic message accounting equipment in order that a disconnect entry identifying the disconnect time of the call connection may be recorded. Thus, on a telephone call the automatic message accounting equipment of a switching system records the called and calling telephone station identities along with the time that the call was answered and the time that the telephone stations disconnected from the call connection. This recorded information is subsequently assembled at a message accounting center to establish a message charge billed to the calling telephone station.

The trunk equipment of a switching system is comprised of a number of trunk circuits, hereinafter referred to as trunks, that are arranged to connect one switching system with another and which are utilized to establish call connections between calling and called telephone stations. Trunks of a switching system bid for the services of a recorder of the automatic message accounting equipment in order that the initial, answer, and disconnect entry information may be entered by the recorder into the memory, magnetic tape, or paper tape of a recorder store. In prior art message accounting systems, trunks requesting the services of a recorder are required to wait until a recorder becomes idle if the recorder is busy servicing another trunk. Since there is a possibility that a trunk may be required to wait for the services of a recorder and it is highly desirable to never overcharge, a time allowance of the maximum time that a trunk may be required to wait for the services of a recorder is deducted from the disconnect time recorded for each call.

In actual usage a number of trunks obtain immediate access to a recorder of the automatic message accounting equipment without waiting. Some trunks obtain access to a recorder after waiting an intermediate interval of time while still other trunks are required to wait for a recorder for the maximum interval of time. Yet, in all cases, the maximum time that a trunk may be required to wait for the services of a recorder is deducted from each recorded call disconnect time thereby accounting for a loss of revenue that is chargeable for the actual time of a call against a calling telephone station.

Some versions of message accounting equipment are arranged to scan the trunks of a switching system to detect the answer and disconnect times of call connections. However, this arrangement involves the additional use of scanner apparatus and requires some means to associate the identity of a trunk with the position of the scanner apparatus in order that the answer and disconnect time of a call connection can be associated with a particular trunk.

Accordingly, a need exists in the art for an automatic message accounting system arranged to adjust the message charging time of a telephone call to compensate for the delay of a call carrying trunk in obtaining access to automatic message accounting equipment. A need also exists for enabling an automatic message accounting system to record a message charging time more closely approximating the actual call handling time of a switching system trunk without requiring the scanning of all the trunks of a switching system.

SUMMARY OF THE INVENTION

In the exemplary embodiment of the invention, a switching system is arranged to record call charging times for usage of communication facilities. The apparatus includes timing circuitry arranged to record the interval of time since a recorder of an automatic message accounting system associated with the switching system was last idle with no call carrying ones of the communication facilities of the switching system waiting to be serviced by the recorder. Additional circuitry responsive to the timing circuitry generates an allowance time utilized to adjust the recording of the call charging time in accordance with the delay that the call carrying ones of the communication facilities experience in obtaining access to the recorder.

In accordance with one feature of the invention apparatus is provided for use with the automatic message accounting equipment of a telephone switching system to measure the period of time since a recorder of the automatic message accounting equipment was last idle with no trunks of the telephone switching system waiting to be serviced. The apparatus generates an accumulated allowance time from the measured time that is utilized for adjusting recorded call charging times of ones of the trunks delayed in being serviced by the automatic message accounting recorder.

Another feature of the invention is the provision of apparatus which operates at the start of usage of an automatic message accounting recorder and which measures intervals of time until the recorder becomes idle with no trunks of a telephone switching system waiting to be serviced by the recorder.

In still another feature of the invention apparatus is provided for use with the automatic message accounting equipment of a telephone switching office to initiate a timing sequence when an automatic message accounting recorder is seized by a switching system call carrying trunk. The apparatus responds to other call carrying trunk requests for service by the recorder by continuing the timing sequence after release of the recorder by the first call carrying trunk and during the access time interval of the recorder by the other call carrying trunks. The apparatus measures sequential intervals of time until access of the recorder by the other call carrying trunks and generates therefrom an accumulated allowance time utilized to adjust recorded call charging times to allow for delay of the other call carrying trunks in accessing the recorder.

DESCRIPTION OF THE DRAWING

The foregoing objectives and advantages as well as others of the invention will be more apparent from a description of the drawing in which FIGS. 1 and 2, when arranged in accordance with FIG. 3, set forth the circuit details of automatic message accounting equipment of a telephone switching system embodying the principles of the present invention.

It will be noted that the drawing employs a type of notation referred to as "Detached Contact" in which an X, shown intersecting a conductor, represents a normally open "make" contact of a relay, and a "bar," shown intersecting a conductor at right angles, represents a normally closed "break" contact of a relay; "normally" referring to the unoperated condition of the relay. The principles of this type of notation are described in an article entitled "An Improved Detached-Contact-Type of Schematic Drawing" by F. T. Meyer, in the September, 1955, publication of *American Institute of Electrical Engineers Transactions, Communications and Electronics*, volume 74, pages 505–513.

GENERAL DESCRIPTION

Figure 1:
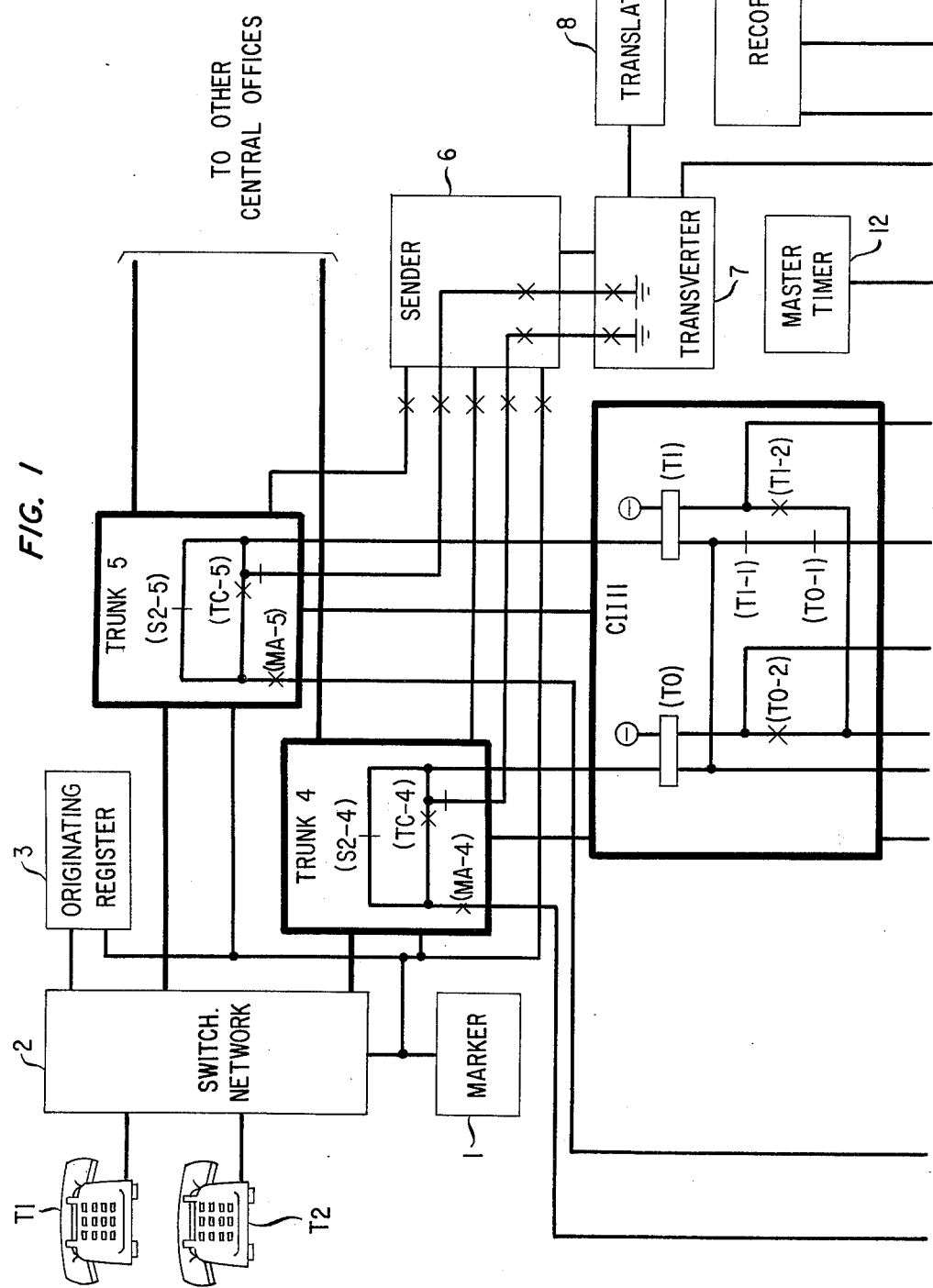
Figure 2:
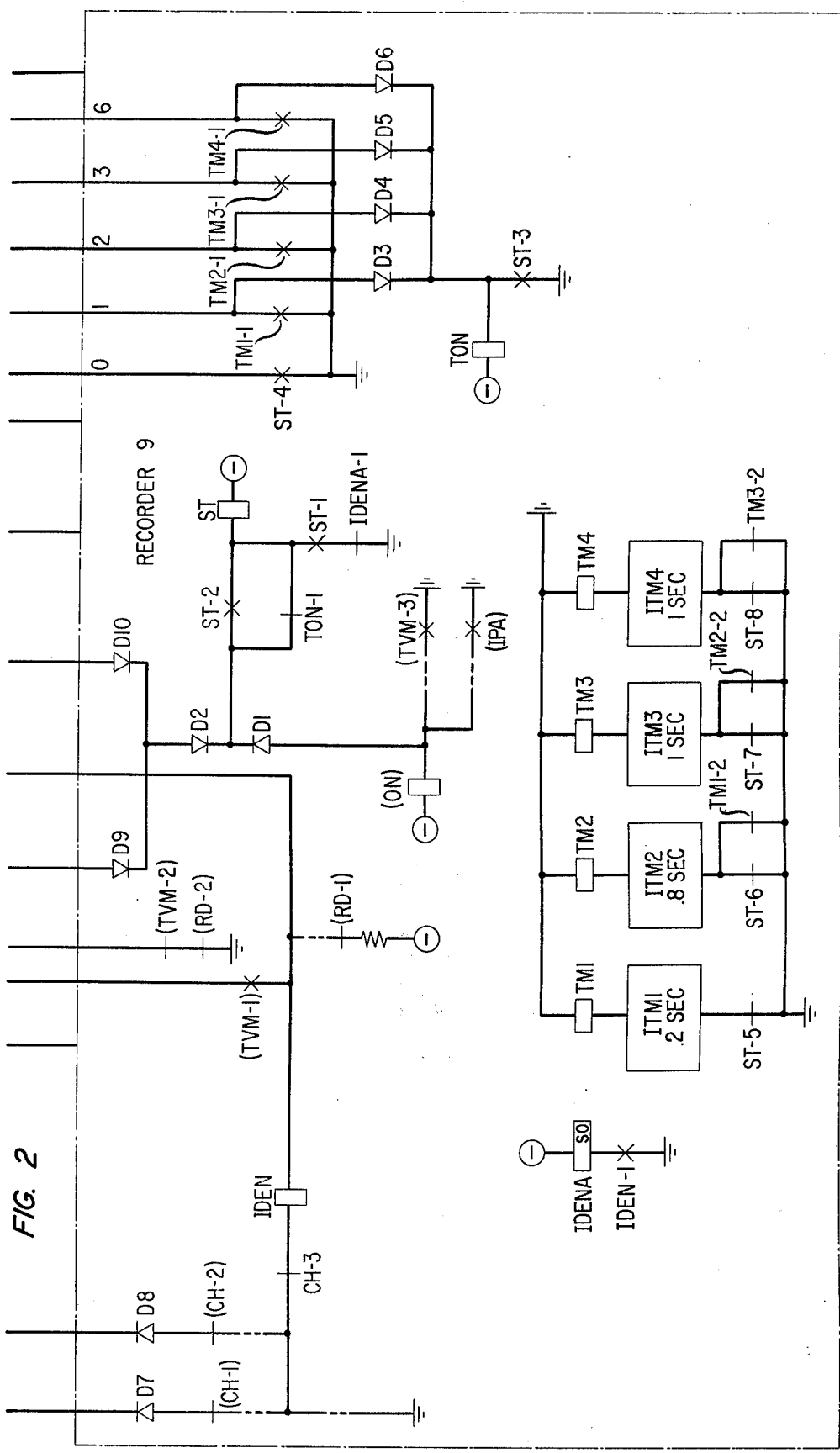

Referring now to FIGS. 1 and 2 of the drawing, it is intended that the apparatus set forth therein be embodied within a switching system serving a plurality of telephone stations, herein represented as telephone stations T1, T2. A telephone subscriber initiates a telephone call by removing the handset of a telephone station, such as telephone station T1, and thereby enabling common control equipment marker 1 in the conventional manner to establish a connection between telephone station T1 and originating register 3 through switch network 2. Upon receiving dial tone, the calling subscriber dials the digits of the called telephone station directory number into originating register 3. After dialing is completed, originating register 3 obtains access to marker 1 and, in the well-known manner, transfers the dialed digits of the called telephone station directory number and the switching equipment location of calling telephone station T1 thereto.

Marker 1 determines that the call is to be routed to a telephone station for which a message charge is to be assessed against calling telephone station T1 by decoding the dialed directory number digits. After decoding, marker 1 selects an idle trunk, such as trunk 5, to complete the call to the called telephone station. A connection is then established through switch network 2 between selected trunk 5 and calling telephone station T1. In addition, marker 1 selects an idle sender 6 and transfers thereto the dialed directory number digits and the switching equipment location of calling telephone station T1.

Sender 6, recognizing that a message charge is to be assessed against calling telephone station T1, accesses transverter 7 of the switching system automatic message accounting equipment and transfers thereto the dialed directory number digits and the switching equipment location of calling telephone station T1. Transverter 7 initiates an initial entry identifying the telephone call by requesting translator 8, in the well-known manner, to translate the switching equipment location of calling telephone station T1 into the directory number assigned telephone station T1. Following translation, transverter 7 requests access to recorder 9 in order that recorder 9 may direct recorder store 10 to register an initial entry in either memory or on magnetic or paper tape.

After recorder 9 has been seized, transverter 7 requests trunk 5 to signal a trunk identifier, hereinafter referred to as call identity indexer 11, to transmit the identity of trunk 5 to seized recorder 9. Recorder 9, under control of transverter 7, directs recorder store 10 to record the initial entry identifying the call by registering the calling and called telephone station directory numbers along with the identity of trunk 5 utilized for establishing the call connection. After recording of the initial entry, sender 6 completes outpulsing the dialed directory number digits to a distant office for the purpose of establishing a call connection of the called telephone station. Sender 6, transverter 7, call identity indexer 11, recorder 9, and recorder store 10, releases from the call connection which continues to be held under control of trunk 5.

When the called telephone station answers, trunk 5 bids for the services of recorder 9 via call indexer 11 and requests that recorder 9 direct recorder store 10 to register an answer entry indicating that a connection has been established with the called telephone station. After the answer entry, which indicates that the message charge interval has been started by identifying trunk 5 and the time designated by master timer 12 that recorder store 10 registered the answer entry is recorded, call identity indexer 11, recorder 9, and recorder store 10, release from the call connection.

Upon disconnect of the calling and called telephone stations, trunk 5 again bids for the services of recorder 9 in order to direct recorder store 10 to register a disconnect entry. After trunk 5 obtains access, recorder 9 in connection with master timer 12 directs recorder store 10 to register identity of trunk 5 and the time recorder 9 is seized by trunk 5 via call identity indexer 11.

Each trunk of a telephone switching system handling a subscriber billable call requests the services of automatic message accounting recorder 9 several times during the duration of a telephone call. Recorder 9 is seized initially to register an initial entry identifying the calling and called telephone stations, a second time to register an answer entry identifying the time that the message billing interval is to start, and a third time to register a disconnect entry identifying the time that the message billing interval is to end. A typical telephone switching system is equipped with a large number of call carrying trunks 4, 5 and a small number of automatic message accounting recorders 9. Thus, when a call carrying trunk 4 bids for the services of recorder 9, recorder 9 may be servicing another call carrying trunk, such as trunk 5, and trunk 4 is required to wait for a period of time until recorder 9 becomes idle.

In the embodiment of the present invention, recorder 9 is provided with apparatus ITM1, ITM2, ITM3, ITM4 for measuring the period of time since recorder 9 was last idle waiting to service trunks 4, 5 through transverter 7 and call identity indexer 11. When recorder 9 is seized by transverter 7 and trunk 5 through call identity indexer 11 to register an initial answer or disconnect entry, the aforementioned measuring apparatus ITM1, ITM2, ITM3, ITM4 initiates a timing interval. Recorder 9 immediately services transverter 7 and trunk 5 by seizing recorder store 10 and causing the appropriate initial, answer, or disconnect entry to be registered therein. In addition, the aforementioned timing apparatus of recorder 9 generates an allowance time of 0 seconds which is transmitted to recorder store 10 to indicate that trunk 5 has immediate access to recorder 9 and that the registered times initiated by master timer 12 for disconnect entries should not be adjusted to compensate for delay in obtaining access to recorder 9.

If, for example, trunk 5 has access to recorder 9 and trunk 4 bids, via call identity indexer 11, for the services of busy recorder 9, the timing apparatus ITM1, ITM2, ITM3, ITM4 continues to measure time following release of trunk 5 and generates an allowance time which is transmitted to recorder store 10 to adjust the delayed disconnect time subsequently registered by recorder store 10 to the earliest time disconnect could have been detected by call carrying trunk 4.

DETAILED DESCRIPTION

A. Initial Entry Seizure

It is assumed for the embodiment of the invention that the switching system set forth in FIGS. 1 and 2 of the drawing is a telephone switching system of the type disclosed in U.S. Pat. No. 2,585,904, issued to A. J. Busch on Feb. 19, 1952. It is further assumed that the Busch telephone switching system is equipped with the type of automatic message accounting equipment disclosed on June 3, 1952, by H. D. Cahill et al. in U.S. Pat. No. 2,599,358 for use in assessing message charges against calling telephone stations. The designation of apparatus disclosed in the previously issued patents is enclosed in parenthesis.

When recorder 9 is in the idle state waiting to service a call carrying trunk, a path extends from ground through normal break contacts CH-3, the winding of relay IDEN, and normal contacts (RD-1) to resistance battery. The resulting flow of current maintains relay IDEN in the operate state thereby closing make contacts IDEN-1 to provide an obvious operate path for relay IDENA.

Transverter 7 seizes recorder 9 to request an initial entry for call carrying trunk 5 by closing make contacts (TVM-3) to provide an operate path for off normal relay (ON). In addition, ground is applied through make contacts (TVM-3), forward biased on diode D1, and normal contacts TON-1 to operate start relay ST. Operation of relay ST closes make contacts ST-3 to provide an obvious operate path for relay TON and opens break contacts ST-5, ST-6, ST-7, and ST-8. The opening of break contacts ST-5 removes ground from the input of timing circuit ITM1 and enables timing circuit ITM1 to initiate a first timing interval, which for the embodiment of the invention is assumed to be 0.2 seconds.

Following the seizure of recorder 9 by transverter 7, relay (CH), not shown, operates in the well-known manner to open normally closed break contacts (CH-1), (CH-2), CH-3 and thereby removes the ground formerly applied to diodes D7, D8 and the winding of relay IDEN. Relay IDEN then releases and thereby opens make contacts IDEN-1 to release relay IDENA. Relay IDENA in releasing closes break contacts IDENA-1 to provide a holding path to ground for previously operated relay ST through closed make contacts ST-1.

Recorder 9 in the well-known manner then directs recorder store 10 to register an initial entry for trunk 5 and releases from transverter 7 in order to be available to serve other call carrying trunks. In releasing, recorder relay (TVM), not shown, opens make contacts (TVM-3) to remove the ground from diode D1. Recorder relay (CH), not shown, also releases and closes break contacts (CH-1), (CH-2), CH-3 to apply ground through diodes D7, D8 to trunks 4, 5 and to the winding of relay IDEN. Relay IDEN then operates over a path extending from ground through break contacts CH-3, the relay winding, and break contacts (RD-1) to resistance battery. Operated relay IDEN closes make contacts IDEN-1 to subsequently enable slow operate relay IDENA and thereby release the hold path for relay ST by opening break contacts IDENA-1. Release of recorder start relay ST closes break contacts ST-5 to reapply ground to the input of timing circuit ITM1.

B. Disconnect Entry Following Initial Entry Seizure

During the registering of an initial entry, the break contacts (CH-1), (CH-2), CH-3, (TVM-2) and make contacts (TVM-1), (TVM-3), of recorder 9 are opened and closed, respectively, thereby maintaining relay ST in the operate state. Another call carrying trunk, for example, trunk 4, may detect a subscriber disconnect from a call connection during this interval and place a bid, via call identity indexer 11, for recorder 9. At the time the disconnect is detected, normal contacts (S2-4) of trunk 4 releases while contacts (MA-4) and transfer contacts (TC-4) remain, respectively, in the operated and released state.

Following registration of the initial entry for trunk 5 and prior to release of recorder 9 by transverter 7, the (CH) relay, not shown, releases to close break contacts (CH-1) and thereby apply ground to diode D7. Diode D7 conducts and current flows from ground through break contacts (CH-1) and diode D7 to trunk 4 through operated make contacts (MA-4) and released break contacts (S2-4) to call identity indexer 11 through the winding of relay (T0) and make contacts (TVM-1) to resistance battery in recorder 9 through closed break contacts (RD-1). Relay (T0) of call identity indexer 11 operates over this path to open break contacts (T0-1) and close make contacts (T0-2) to partially establish a hold path for relay (T0) from ground supplied by recorder 9 through series normal break contacts (RD-2), (TVM-2).

Transverter 7, serving trunk 5, releases from recorder 9 after the registering of the initial entry by opening make contacts (TVM-1), (TVM-3) and closing break contacts (TVM-2). Ground appearing through closed make contacts (T0-2) enables recorder diodes D9, D2 to conduct and thereby provide another hold path for relay ST through closed make contacts ST-2.

The closing of normal contacts CH-3 re-establishes an operate path for relay IDEN which closes make contacts IDEN-1 to establish an operate path for relay IDENA. Relay IDENA is a slow to operate relay and does not open break contacts IDENA to interrupt the previous hold path through make contacts ST-1 until the aforementioned hold path has been established through diodes D9, D2 from call identity indexer 11. Recorder relay ST does not release at this time in that trunk 4, having previously detected a call disconnect, provides a hold path for relay ST through the make contacts (T0-2) of call identity indexer 11. Timing circuit ITM1 continues to measure the time that call carrying trunk 4 could have been waiting to be served by recorder 9, and after a first-time interval, herein assumed to be 0.2 seconds, operates relay TM1. Relay TM1 in operating opens break contacts TM1-2 to remove ground from the input of timing circuit ITM2. Timing circuit ITM2 continues to measure the time that trunk 4 waits to be serviced by recorder 9 and if trunk 4 still has not been serviced after 1 second, operates relay TM2 a second time interval, herein represented as 0.8 seconds, after the operation of relay TM1. Relay TM2 in operating opens contacts TM2-2 to remove ground from the input of timing circuit ITM3.

Waiting trunk 4 accesses recorder 9 to initiate registering of the disconnect entry by closing make contacts (IPA) to operate relay (ON) and apply ground to diode D1 to maintain relay ST in the operate state. When recorder 9 directs recorder store 10 to register the disconnect entry, ground is applied to leads 0, 1, 2 through operated make contacts ST-4, TM1-1, TM2-1 to direct recorder store 10 to adjust the registered disconnect entry time by 2 seconds to agree with the time of disconnect previously detected by waiting trunk 4.

Upon disconnect of recorder 9 from recorder store 10, break contacts (RD-1), (RD-2) open to release recorder relay IDEN and call identity indexer relay (T0). In addition, the removal of ground through call identity indexer make contacts (T0-2) inhibits operation of recorder diodes D9, D2 and thereby inactivates a holding path for operated relay ST. After disconnect of recorder store 10 and call identity indexer 11 from recorder 9, which then becomes available to serve now idle trunks 4, 5, break contacts (RD-1) close to establish an operate path for relay IDEN and make contacts (IPA) open to interrupt the holding path for relay ST through diode D1. Relay IDENA subsequently operates to open break contacts IDENA-1 and thereby release relay ST. Release of relay ST opens make contacts ST-3 to release a hold path for relay TON and closes break contacts ST-5, ST-6, ST-7 and ST-8 to recycle timing apparatus ITM1, ITM2, ITM3 and ITM4. When each timer ITM1, ITM2, ITM3, ITM4 recycles, the associated relays TM1, TM2, TM3, TM4 release. After all TM- relays release relay TON releases, indicating that all timers have recycled. Release of relay TON closes break contact TON-1 to establish a path to permit relay ST to operate on subsequent recorder seizures.

C. Disconnect Entry Following a Disconnect Entry

It may happen that while recorder 9 is busy serving transverter 7, trunks 4 and 5 both detect a disconnect of a call connection by releasing their respective (S2-4), (S2-5) break contacts. Since recorder break contacts (CH-1), (CH-2) are open while recorder 9 is registering an initial entry via transverter 7, neither of the call identity indexer relays (T0), (T1) operate. Following registration of the initial entry, recorder contacts (CH-1), (CH-2), CH-3 release and apply ground to diodes D7, D8. One of the call identity indexer relays, for example, (T0), will operate over path from ground through diode D7, trunk 4 break and make contacts (S2-4), (MA-4), respectively, through the winding of relay (T0) and series break contacts (T1-1), (T0-1) to resistance battery through break contacts (RD-1).

In the aforementioned manner, recorder 9 completes the initial entry registration and is released by transverter 7. Break contacts (TVM-2) close and provides a hold path for relays ST, (T0). Operation of relay (T0) opens break contacts (T0-1) to inhibit operation of relay (T1). Trunk 4 seizes recorder 9 through call identity indexer 11 and initiates the registration of a disconnect entry by recorder store 10. During this interval of time, recorder relay ST remains in the operate state thereby continuing the operation of timing apparatus ITM1, ITM2, ITM3, ITM4. Prior to completion of registration of the disconnect entry for trunk 4, recorder break contacts (RD-1), (CH-1), (CH-2), CH-3 are released and relay ST is held operated over paths established through forward biased diodes D9, D2 and closed make contacts (IPA).

After registration of a disconnect entry, recorder break contacts (RD-1), (RD-2) are opened during release of recorder store 10 to release relay IDEN and to initiate the release of trunk 4 and call identity indexer 11. Relay IDEN releases and opens make contacts IDEN-1 to release relay IDENA and thereby provide a hold path for relay ST through series break contacts ST-1, IDENA-1. Recorder contacts (RD-1), (RD-2) subsequently close after release of recorder store 10, call identity indexer 11 and trunk 4. At this time, an operate path is established for relay (T1) from ground through diode D8 to waiting trunk 5 and through make contacts (MA-5), break contacts (S2-5) to the winding of relay (T1), through series break contacts (T1-1), (T0-1), (RD-1) to resistance battery. Relay (T1) operates and closes make contacts (T1-2) to provide a self-hold path and a hold path for recorder relay ST. Release of break contacts (RD-1) reoperates relay IDEN and provides an operate path through make contacts IDEN-1 for relay IDENA. However, relay IDENA being a slow operate relay does not operate until a hold path for relay ST has previously been established through closed make contacts (T1-2) and diodes D10, D2.

During the registration of the initial entry for transverter 7 and the disconnect entry for trunk 4, timing apparatus ITM1, ITM2 is assumed to have operated relays TM1, TM2 and transmitted an adjustment time of 2 seconds to recorder store 10 for the trunk 4 disconnect entry. Recalling that the operation of relay TM2 activated timing circuit ITM3 and that relay ST is held operated by waiting trunk 5, timing circuit ITM3 continues to measure time and subsequently operates relay TM3. Operation of relay TM3 opens break contacts TM3-2 to activate timing circuit ITM4 by removing ground from the input thereof. Assuming that waiting trunk 5 obtains access to recorder 9 at this time, recorder 9 directs recorder store 10 to register the disconnect entry and transmits ground to recorder store 10 over leads 0, 1, 2, 3 through closed make contacts ST-4, TM1-1, TM2-1, TM3-1 to indicate that the register disconnect time is to be adjusted by 3 seconds to agree with the earliest time trunk 5 could have detected disconnect. After registration of the disconnect entry, recorder 9 disconnects from trunk 5 and call identity indexer 11 in the aforementioned manner and releases relay ST to initialize timing apparatus ITM1, ITM2, ITM3, ITM4.

D. Disconnect Entry Following Initial and Answer Entries

Transverter 7 initiates the initial entry sequence for a trunk such as trunk 5 by bidding for recorder 9. After seizure of recorder 9, transverter 7 identifies trunk 5 to recorder 9 by applying ground through released portion of transfer contacts (TC-5) of trunk 5 to the winding of call identity index relay (T1). Relay (T1) operates over the path completed through series break contacts (T1-1), (T0-1), (RD-1) to resistance battery and closes make contacts (T1-2) to provide a hold path for recorder relay ST. After registration of the initial entry, transverter 7, trunk 5, and call identity indexer 11 release from recorder 9. Following the initial entry sequencing, trunk 5 closes the make portion of transfer contacts (TC-5) and waits for called station answer. Trunk 5 detects called station answer by opening break contacts (S2-5) and closing make contacts (MA-5). Upon bidding for the services of idle recorder 9 to register an answer entry in recorder store 10, a path is established to operate call identity indexer relay (T1) over a path from recorder ground and battery extending through operated make contacts (TC-5), (MA-5) of trunk 5. Operation of make contacts (T1-2) establishes a hold path for recorder relay ST through diodes D10, D2. Following registration of the trunk 5 answer entry, trunk 5 make portion of transfer contacts (TC-5) release.

Should trunk 4 detect a call disconnect during the registration of the trunk 5 answer entry, trunk 4 will bid for busy recorder 9 and releases break contacts (S2-4) to establish a continuity path through break contacts (S2-4) and make contacts (MA-4). In the manner previously described, trunk 4 establishes a hold path for recorder relay ST after the registration of trunk 5 answer entry to continue operation of timing apparatus ITM1, ITM2, ITM3, ITM4. When waiting trunk 4 obtains access to recorder 9, the timing apparatus generates a value of time which is utilized for adjusting the registered disconnect time to agree with the earliest time trunk 4 could have detected disconnect.

Summary

It is obvious from the foregoing that the facilities, economy, and efficiency of switching systems may be substantially enhanced by the provision of automatic message accounting equipment apparatus arranged to compensate for delays between the time registered for a message disconnect entry and the time of disconnect detected by a call carrying trunk of the switching system. It is further obvious from the foregoing that the instant apparatus for measuring the period of time since recorder equipment was last idle with no switching system trunks waiting to be served to derive a time for correcting trunk waiting times obviates the need to provide trunk scanning apparatus for a switching system.

While the apparatus of our invention has been disclosed in a telephone switching system for use in adjusting registered disconnect times to compensate for delays between the time the trunk detected disconnect and the time the disconnect is recorded it is to be understood that such an embodiment is intended to be illustrative of the principles of our invention and that numerous other arrangements may be devised by those skilled in the art without departing from the spirit and scope of the invention. For example, the instant apparatus may be used to adjust times registered for initial and answer entries, or other telephone subscriber use entries, to agree with the time that the switching system requested the automatic message accounting equipment to register entry information.

What is claimed is:

1. In a switching system wherein call charging times are recorded for usage of a communication facility and wherein the times recorded are subject to adjustment to allow for delay in accessing recording equipment, the combination comprising
    means for measuring an interval of time since the recording equipment was last idle with no request for access thereto, and
    means responsive to said measuring means for generating an allowance time signal to adjust the recording of the charge time in accordance with the access delay to the recording equipment.

2. In a switching system, the combination in accordance with claim 1 wherein said measuring means comprises a series of sequentially operated time circuits.

3. In a switching system, the combination in accordance with claim 2 wherein said generating means comprises a plurality of relays each connected to one of said timer circuits and each defining an accumulated allowance time signal.

4. An automatic message accounting system for use with switching system trunks to record call charging times comprising
    means for detecting requests to service call carrying ones of the trunks by registering identities thereof at the inception of a call and again at the times of call answer and call disconnect,
    means for measuring intervals of time that the automatic message accounting system is busy servicing the call carrying trunks, and
    means enabled by said measuring means for generating and registering an allowance time to adjust the recorded call charging times of trunks delayed in being serviced by the automatic message accounting system.

5. The automatic message accounting system set forth in claim 4 wherein said detecting means comprises
    means operable for indicating a seizure of the automatic message accounting system by one of the call carrying trunks, and
    means for maintaining said indicating means in an operate state when other call carrying trunks are waiting to be serviced following release of the one call carrying trunk.

6. The automatic message accounting system set forth in claim 5 wherein said measuring means comprises a plurality of timer circuits activated by said indicating means and arranged to generate sequential signals denoting predetermined intervals of time.

7. The automatic message accounting system set forth in claim 6 wherein said generating and registering means comprises a plurality of relays each operated by one of said sequential signals and each arranged to close make contacts signifying a discrete increase of said allowance time.

8. An automatic message accounting system for use with telephone office trunks employing transverters and trunk identifiers to record call charging times comprising
    first relay means operable by the transverters and the trunk identifiers for indicating a seizure of the automatic message accounting system by a carrying one of the trunks, holding means responsive to the trunk identifiers for maintaining said first relay means in an operate state when other ones of call carrying trunks are waiting to be serviced following release of the one call carrying trunk, timing means activated by operation of said first relay means for generating sequential signals denoting predetermined intervals of time, and second relay means operated by ones of the sequential signals for registering allowance time signals to adjust the recorded call charging times to allow for delay of the call carrying trunks in accessing the automatic message accounting system.

9. An automatic message accounting system for use with telephone office trunks employing trunk identifiers and arranged to record message call charging times comprising means responsive to the trunk identifiers for recording the message call charging times by registering identities of call carrying ones of the trunks at the inception of a call and again at answer and disconnect times determined at time of access to said recording means by one of the trunk identifiers, means for measuring the period of time since said recording means was last idle with no trunks waiting to be serviced, and means enabled by said measuring means for generating and registering a discrete allowance time to adjust the registered disconnect times in accordance with delay times encountered by ones of said trunk identifiers in obtaining access to said recording means.

10. A recorder for use with telephone office trunks to record message charging times subject to adjustment to allow for delay of ones of the trunks in obtaining access to the recorder comprising means for measuring intervals of time since the recorder was last idle with none of the trunks requesting access thereto, and means responsive to said measuring means for generating and registering discrete allowance time signals to adjust the recording of the message charging times in accordance with delay of ones of the trunks in obtaining access to the recorder.

* * * * *